(12) United States Patent  (10) Patent No.: US 7,660,956 B1
Nadathur et al.  (45) Date of Patent: Feb. 9, 2010

(54) SAVE SET BUNDLING FOR STAGING

(75) Inventors: Anand Nadathur, Santa Clara, CA (US); Ken Owens, Burlington (CA); Yasemin Ugur Ozekinci, Burlington (CA)

(73) Assignee: EMC Corporation, Hopkinton, MA (US)

( * ) Notice: Subject to any disclaimer, the term of this patent is extended or adjusted under 35 U.S.C. 154(b) by 371 days.

(21) Appl. No.: 11/651,400

(22) Filed: Jan. 8, 2007

(51) Int. Cl.
G06F 12/00 (2006.01)

(52) U.S. Cl. ............... 711/162; 711/111; 711/112; 711/161; 707/204; 714/6

(58) Field of Classification Search ......... 711/111–112, 711/114, 161–162, 165; 707/200, 204–205; 714/6–7
See application file for complete search history.

(56) References Cited

U.S. PATENT DOCUMENTS

2007/0027937 A1* 2/2007 McGrattan et al. .......... 707/204

* cited by examiner

*Primary Examiner*—Jasmine Song
(74) *Attorney, Agent, or Firm*—Van Pelt, Yi & James LLP

(57) ABSTRACT

Backing up data blocks is disclosed. An indication that a first set of one or more backed up data blocks are related at an application level to one or more other sets of one or more backed up data blocks is received. An associating data that associates the first set of backed up data blocks with the one or more other sets of backed up data blocks is stored. The associating data is used to ensure that the first set and the one or more other sets remain stored together.

19 Claims, 4 Drawing Sheets

US 7,660,956 B1

SAVE SET BUNDLING FOR STAGING

BACKGROUND OF THE INVENTION

Some backup systems backup data as opaque data blocks. For example, data blocks comprising the data to be backed up are backed up as one or more groups of data blocks that are not necessarily related to each other on an application-level. Typically multiple backup streams are written at the same time, and application-level related data blocks are split into different groups to be written by different backup streams. Since the backup system does not retain knowledge of the application-level relationships, related groups of data blocks can become separated (e.g., placed in different backup medias, some blocks migrated offsite while other blocks related to the migrated blocks at the application level remain onsite, etc.), causing subsequent processing of related groups of backed up data blocks to become inefficient. Therefore, there exists a need to more efficiently manage the storage and migration of data blocks that are related on an application-level.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Associating together backed up data blocks that are related to one another on an application-level is disclosed. In some embodiments, the application-level association includes an association created and/or indicated by an application but not indicated by a file system level association. For example, database object data blocks that are spread across multiple file system objects, such as multiple files and/or other file system groupings, are associated together by a database application on an application-level. In some embodiments, an identifier that allows an application-level association between a plurality of backed up data blocks is included in an index of backed up data blocks. For example, entries of the index that are associated with data blocks related together on an application-level include the same identifier.

Figure 1:
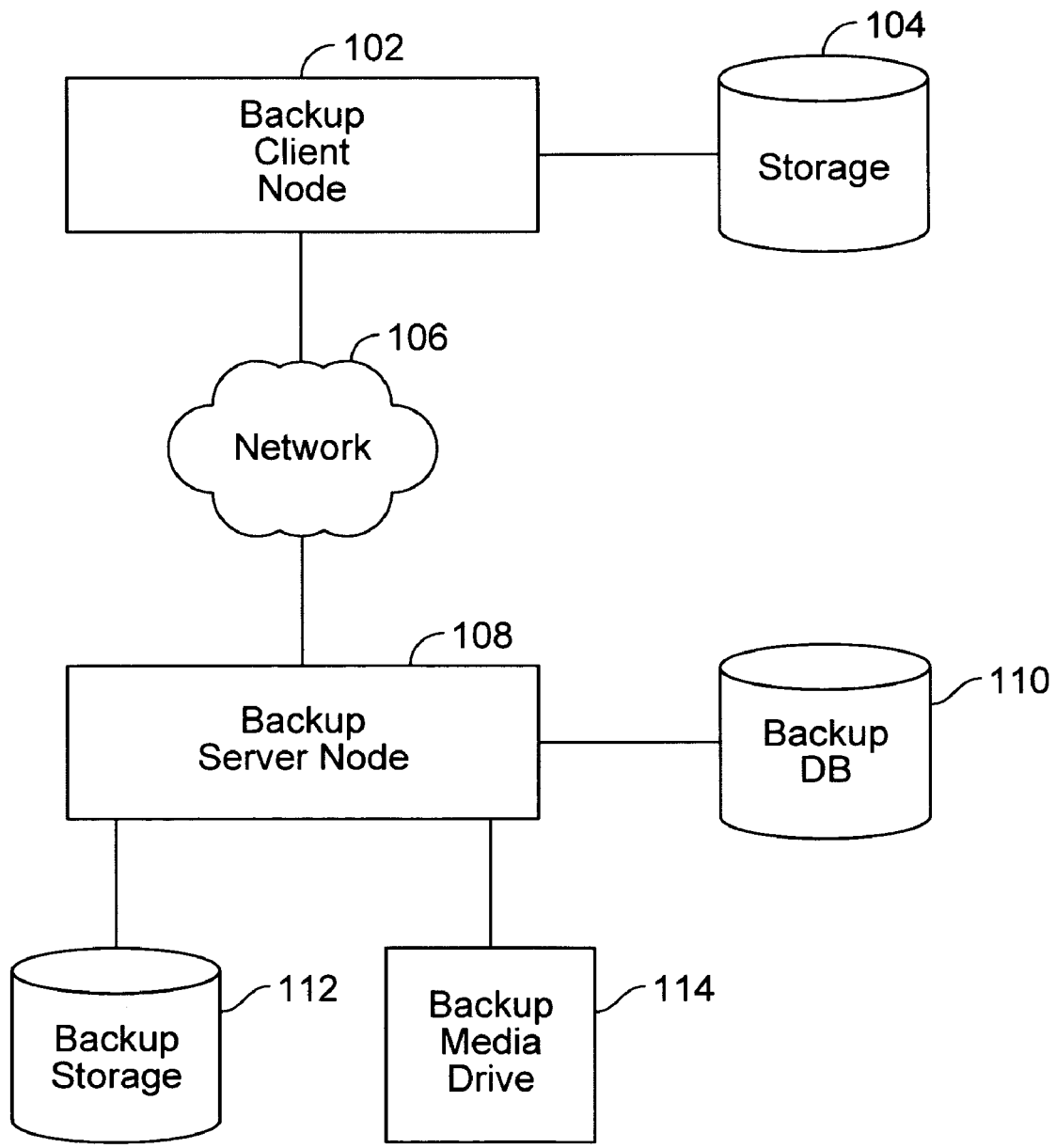
FIG. 1 is block diagram illustrating an embodiment of a backup environment.

FIG. 1 is block diagram illustrating an embodiment of a backup environment. Backup client node 102 and backup server node 108 are connected together through network 106. Network 106 comprises a public or private network and/or combination thereof, for example an Ethernet, serial/parallel bus, intranet, Internet, LAN, WAN, SAN, and other forms of connecting multiple systems and/or groups of systems together. In various embodiments, any number client nodes and backup system nodes may exist. Storage 104 is connected to backup client node 102, and the backup client node stores and/or reads data stored in storage 104. In some embodiments, storage 104 is not directly connected to client node 102, and client node 102 communicates with storage 104 through network 106. Backup server node 108 backs up data included in storage 104 to backup storage 112 and/or a media of backup media drive 114. In some embodiments, backup media drive 114 includes one or more of the following: a backup tape drive, a tape library, an optical drive, and one or more other types of storage drives.

Backup database 110 includes information associated with data backed up by backup server node 108. For example, in various embodiments one or more of the following information is stored in backup database 110: information grouping one or more backed up data blocks, information identifying a file system attribute of one or more backed up data blocks, information identifying storage location of one or more backed up data blocks, information associating one or more backed up data blocks on an application-level, and information associating one or more groups of backed up data blocks on an application-level. In various embodiments, backup storage 112, backup media drive 114, and/or backup database 110 is not directly connected to server node 108, and server node 108 communicates with backup storage 112, backup media drive 114, and/or backup database 110 through network 106 and/or some other network.

Figure 2:
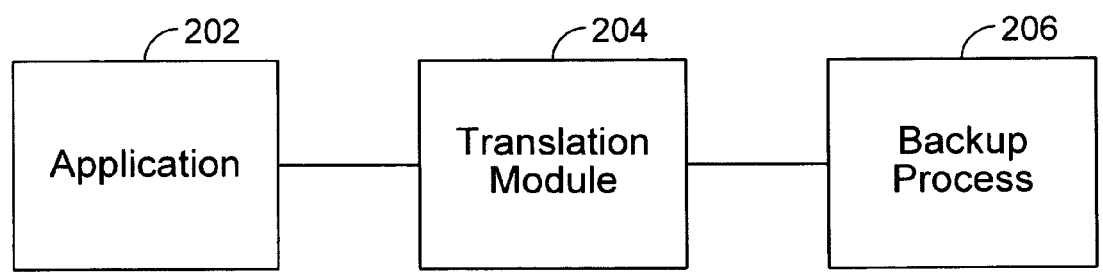
FIG. 2 is a block diagram illustrating an embodiment of modules of a backup system or application.

FIG. 2 is a block diagram illustrating an embodiment of modules of a backup system or application. In some embodiments, the modules of FIG. 2 are at least in part included in backup client node 102 and/or backup server node 108 of FIG. 1. Application 202 modifies and/or generates application-level data that is to be backed up. Backup process 206 backs up data on a file system level and/or on a storage system (e.g., block) level. Since application 202 and backup process 206 utilize data on different levels, translation module 204 translates the application-level data of application 202 to a level that can be used by backup process 206 to back up data. In some embodiments, translation module 204 identifies to backup process 206 one or more data blocks of application-level data specified by application 202 to be backed up. In some embodiments, translation module 204 provides backup data information to be stored in a backup database such as backup database 110 of FIG. 1. Information such as backed up data attribute, backed up data file name, and/or application-level association between backed up data is determined and/or provided by translation module 204. In some embodiments, the application-level association is provided by translation module 204 as an identifier associated with a data block and/or a group of data blocks. For example, backed up data blocks associated together on an application-level are associated with the same identifier in the backup database. In some embodiments, translation module 204 is associated with a plurality of applications, and in other embodiments, the translation module is specific to application 202.

Figure 3:
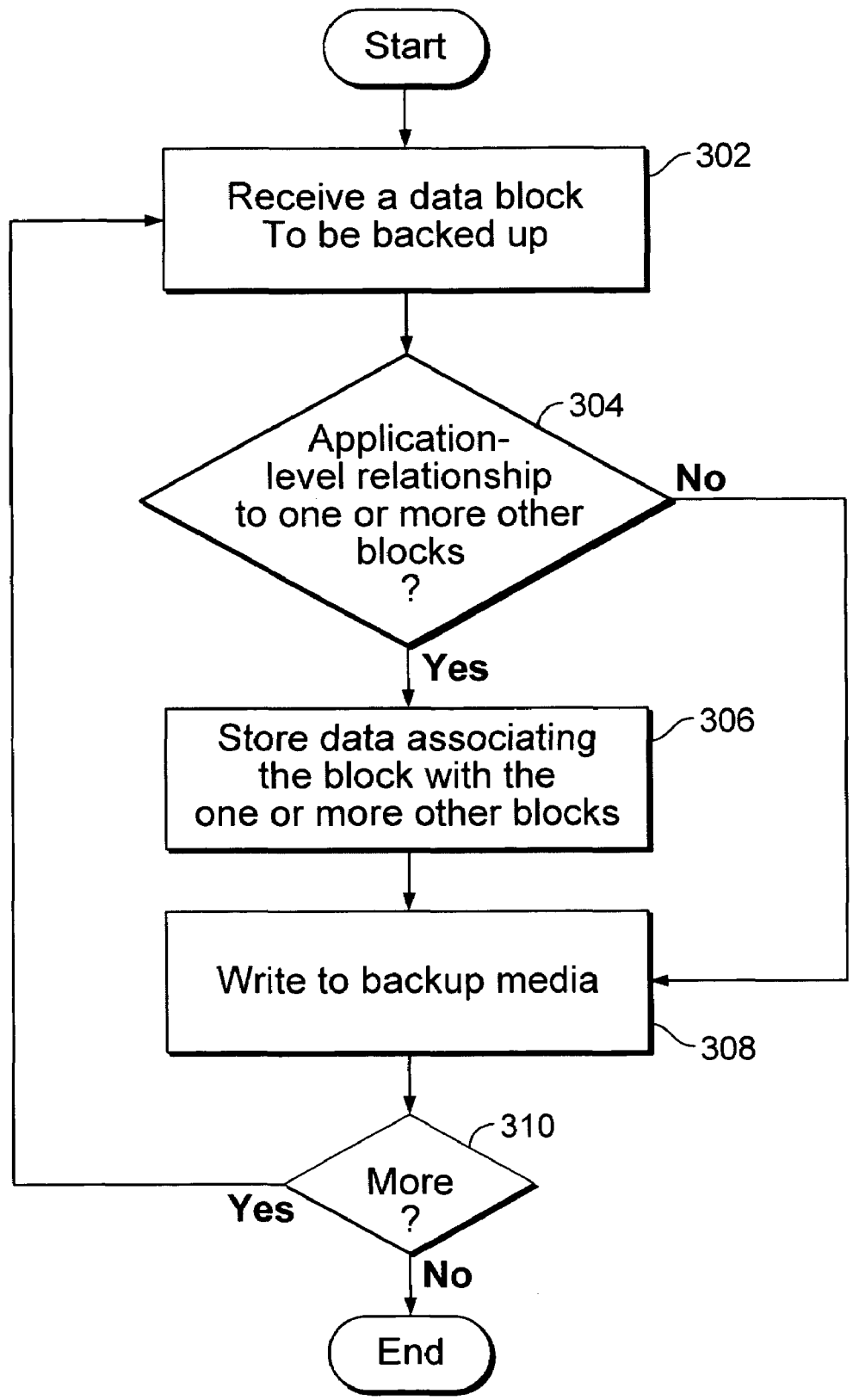
FIG. 3 is a flowchart illustrating an embodiment of a process for backing up data. In some embodiments, the process of FIG. 3 is implemented at least in part by backup process 206 of FIG. 2.

FIG. 3 is a flowchart illustrating an embodiment of a process for backing up data. In some embodiments, the process of FIG. 3 is implemented at least in part by backup process 206 of FIG. 2. At 302, a data block to be backed up is received. In some embodiments, multiple blocks may be received at the same time and/or via multiple streams or threads.

It is determined at 304 whether the block received at 302 is related at an application level to one or more other blocks. In some embodiments, a save set comprising one or more data blocks is received at 302, and the determination made at 304 is whether the save set received at 304 is related to one or more other save sets, such that the related save sets should be associated together into a "bundle". Examples of a relationship between save sets includes two or more save sets each including blocks associated with the same database, database object, file, or other stored object; and a first save set comprising blocks associated with an incremental backup and a related save set comprising blocks associated with a prior full and/or incremental backup on which the incremental backup with which the blocks of the first save set are associated depends.

If it is determined at 304 that the block (or save set) received at 302 is related at an application level to one or more other blocks (or save sets), data associating the block received at 302 with the one or more other blocks with which it is related at the application level is stored at 306. In some embodiments, an identifier that can be used to associated the data block on an application-level to one or more other backed up data blocks is received at 302, along with the block, and/or received and/or otherwise determined at 304, if applicable. In some embodiments, the data comprises an identifier indicating the application level relationship. Each block included in a set of blocks related to one another at the application level is associated with the same identifier, e.g., in an index or other data store. In some embodiments, the indication and the identifier are at least in part determined by translation module 204 of FIG. 2. For example, translation module 204 determines a file system level specification and an application-level identifier using an application-level specification of the data to be backed up. An example of the application-level specification of the data to be backed up includes one or more of the following: a specification of one or more application-level related files, a specification of one or more database objects, a specification of an incremental backup, and a specification of a backup version. In some embodiments, the indication of the data block is received as an indication of a file system object, such a file and/or other grouping of one or more data blocks.

At 308, after the data associating the block with the one or more other blocks with which the block received at 302 is related at an application level, if applicable, or if it is determined at 304 that the block received at 302 is not related at an application level with any other blocks, the block received at 302 is written to backup media. In some embodiments, backing up the data block includes storing the data block in a grouping (e.g., save set) of one or more backed up data blocks. In some embodiments, storing the identifier includes associating the identifier with an index entry associated with the data block. For example, there exists an entry in the index for each save set, and an identifier included in an index entry can be used to determine application-level related save sets. In some embodiments, the index entry includes information identifying storage location of the backed up data block. For example, location within a storage drive and/or an identification of a backup media storing the backed up data block is included in the index entry. In some embodiments, the index is included in a database such as backup database 110 of FIG. 1. The index may be stored separately and/or together with the backed up data block. In some embodiments, the identifier can be use to determine an attribute of the application-level association between the backed up data blocks. For example the type of association and/or a version information can be determined using the identifier. The process of FIG. 3 is repeated, in the example shown, for successive data blocks until it is determined at 310 that no blocks remain to be processed, after which the process of FIG. 3 ends.

Figure 4:
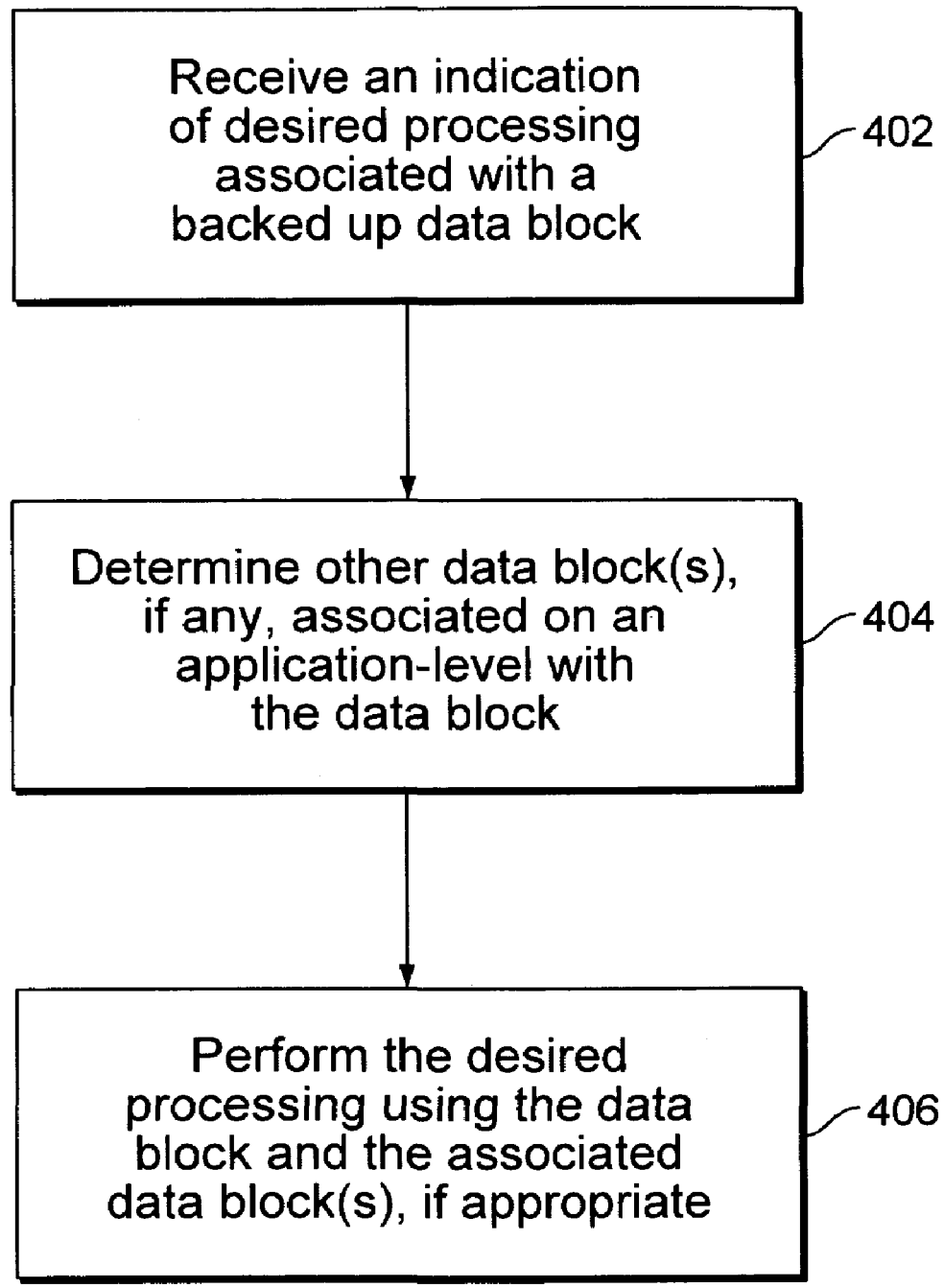
FIG. 4 is flowchart illustrating an embodiment of a process for performing desired processing using a backed up data block.

FIG. 4 is flowchart illustrating an embodiment of a process for performing desired processing using a backed up data block. In some embodiments, the process of FIG. 4 is implemented in backup server node 108 of FIG. 1. At 402, an indication of desired processing associated with a backed up data block is received. Examples of the desired processing includes copying the backed up data block, moving the backed up data block, modifying the backed up data block, restoring the backed up data block, staging the backed up data block for migration to another storage media and/or location, and performing an incremental backup operation associated with the backed up data block. At 404, one or more other backed up data blocks, if any, associated on an application-level with the backed up data block is determined. In some embodiments, determining the other application associated data blocks includes using an index such the index described above in connection with 306 in FIG. 3. For example, using an identifier associated with the backed up data block specified in 402, entries in the index that are associated with the backed up data block on an application-level are determined. The associated index entries are used to determine the other application-level associated data blocks.

At 406, the desired processing is performed using the backed up data block and at least a portion the associated data blocks, if appropriate. For example, when storing/moving backed up data to one or more volumes of removable backup media (e.g., tape or optical disk), it is desired to store all application-level associated data blocks on the same volume of backup media and/or in a contiguous set of locations on the backup media. When storing the backed up data block specified in 402 on to a backup media, other backed up data blocks associated on an application-level with the specified backed up data block can be identified and stored on the same backup media.

In another example, for data blocks associated with an incremental backup to be used to restore a protected system to a state associated with the incremental backup, in some cases a previous incremental backup data may need to be restored before the desired incremental backup data is restored. In some embodiments, the techniques described herein are used to ensure that the data blocks associated with the later incremental backup and the data blocks associated with the previous incremental backup on which the later incremental backup depends remain equally accessible. For example, the techniques described herein are used to store an identifier or other data associating the data blocks associated with the previous incremental backup with the data blocks associated with the later incremental backup, and all are migrated together or not at all, to ensure that some blocks are not migrated to a less readily accessible location than others.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data blocks, comprising:
   receiving an indication that a first set of one or more backed up data blocks are related at an application level to one or more other sets of one or more backed up data blocks;
   storing an associating data that associates the first set of backed up data blocks with the one or more other sets of backed up data blocks;
   using the associating data to ensure that the first set and the one or more other sets remain stored together;
   receiving an indication that a specified backed up data block comprising the first set is to be processed;
   using the associating data to determine that the specified backed up data is related at the application level to one or more other backed up data blocks comprising the one or more other sets; and
   processing together the specified backed up data block and the one or more other backed up data blocks associated on an application-level with the specified backed up data.

2. A method as recited in claim 1, wherein using the associating data to ensure that the first set and the one or more other sets remain stored together comprises ensuring that the backed up data blocks comprising the first set and the backed up data blocks comprising the one or more other sets are stored on a same volume of backup media.

3. A method as recited in claim 1, wherein using the associating data to ensure that the first set and the one or more other sets remain stored together comprises ensuring that the backed up data blocks comprising the first set and the backed up data blocks comprising the one or more other sets are stored in a contiguous set of storage location on a backup storage.

4. A method as recited in claim 1, wherein using the associating data to ensure that the first set and the one or more other sets remain stored together comprises ensuring that the backed up data blocks comprising the first set are not migrated unless the backed up data blocks comprising the one or more other sets are migrated as well.

5. A method as recited in claim 1, wherein storing an associating data that associates the first set of backed up data blocks with the one or more other sets of backed up data blocks comprises including in a backup index, for each of the first set and the one or more other sets, an identifier that indicates that the sets are related at the application-level.

6. A method as recited in claim 1, wherein storing an associating data that associates the first set of backed up data blocks with the one or more other sets of backed up data blocks comprises including in a backup index, for each of the backed up data blocks comprising the first set and the backed up data blocks comprising the one or more other sets, an identifier that indicates that the blocks are related at the application-level.

7. A method as recited in claim 6, wherein the index includes information identifying a file system attribute of one or more of the backed up data blocks.

8. A method as recited in claim 6, wherein the index includes information identifying a storage location of one or more of the backed up data blocks.

9. A method as recited in claim 8, wherein the storage location includes an identification of a specific backup storage media from a plurality of backup storage medias.

10. A method as recited in claim 1, wherein the first set may include one or more blocks that not related at the application level to one or more other blocks in the first set or to one or more other blocks in the one or more other sets.

11. A method as recited in claim 1, wherein the application-level association includes an association indicated by an application but not indicated by a file system level association.

12. A method as recited in claim 1, wherein the associating data is at least in part determined by using a specification of application-level data to be backed up.

13. A method as recited in claim 12, wherein the specification includes or more of the following: a specification of one or more application-level related files, a specification of one or more database objects, a specification of an incremental backup, and a specification of a backup version.

14. A method as recited in claim 1, wherein the application-level relationship between the one or more backed up data blocks and the one or more other backed up data blocks is determined at least in part by determining the one or more backed up data blocks and the one or more other backed up data blocks are associated with the same identifier in the index.

15. A method as recited in claim 1, wherein the associating data can be used to determine an attribute of the application-level relationship.

16. A method as recited in claim 15, wherein the attribute includes one or more of the following: a type of the application-level association and a version information.

17. A method as recited in claim 1, wherein the processing the specified backed up data block includes performing one or more of the following: copying the specified backed up data block, moving the specified backed up data block, modifying specified the backed up data block, restoring specified the backed up data block, staging the specified backed up data block, and performing an incremental backup operation associated with the specified backed up data block.

18. A system for backing up data blocks, comprising:
   a processor configured to receive an indication that a first set of one or more backed up data blocks are related at an application level to one or more other sets of one or more backed up data blocks, store an associating data that associates the first set of backed up data blocks with the one or more other sets of backed up data blocks, use the associating data to ensure that the first set and the one or more other sets remain stored together, receive an indication that a specified backed up data block comprising the first set is to be processed, use the associating data to determine that the specified backed up data is related at the application level to one or more other backed up data blocks comprising the one or more other sets, and process together the specified backed up data block and the one or more other backed up data blocks associated on an application-level with the specified backed up data; and
   a memory coupled with the processor, wherein the memory is configured to provide the processor with instructions.

19. A computer readable medium embodying computer instructions, which when executed cause a processor to:

receive an indication that a first set of one or more backed up data blocks are related at an application level to one or more other sets of one or more backed up data blocks;

store an associating data that associates the first set of backed up data blocks with the one or more other sets of backed up data blocks;

use the associating data to ensure that the first set and the one or more other sets remain stored together;

receive an indication that a specified backed up data block comprising the first set is to be processed;

use the associating data to determine that the specified backed up data is related at the application level to one or more other backed up data blocks comprising the one or more other sets; and process together the specified backed up data block and the one or more other backed up data blocks associated on an application-level with the specified backed up data.

* * * * *